US011520322B2

(12) United States Patent
Mark et al.

(10) Patent No.: US 11,520,322 B2
(45) Date of Patent: Dec. 6, 2022

(54) MANUFACTURING OPTIMIZATION USING A MULTI-TENANT MACHINE LEARNING PLATFORM

(71) Applicant: MARKFORGED, INC., Watertown, MA (US)

(72) Inventors: Gregory Thomas Mark, Newton, MA (US); Corey Hazeltine Walsh, Boston, MA (US); Bruce David Jones, Malden, MA (US)

(73) Assignee: MARKFORGED, INC., Watertown, MA (US)

( * ) Notice: Subject to any disclaimer, the term of this patent is extended or adjusted under 35 U.S.C. 154(b) by 0 days.

(21) Appl. No.: 16/883,487

(22) Filed: May 26, 2020

(65) Prior Publication Data

US 2020/0371509 A1 Nov. 26, 2020

Related U.S. Application Data

(60) Provisional application No. 62/852,766, filed on May 24, 2019.

(51) Int. Cl.
*G05B 19/418* (2006.01)
*G06N 20/20* (2019.01)
*G05B 19/4155* (2006.01)

(52) U.S. Cl.
CPC ... *G05B 19/41885* (2013.01); *G05B 19/4155* (2013.01); *G05B 19/4183* (2013.01); *G06N 20/20* (2019.01)

(58) Field of Classification Search
CPC .......... G05B 19/41885; G05B 19/4155; G05B 19/4183; G06N 20/20; G06N 20/10;
(Continued)

(56) References Cited

U.S. PATENT DOCUMENTS

2019/0163172 A1* 5/2019 Daniel ................... B25J 11/005
2020/0017117 A1* 1/2020 Milton .................. B60W 50/02
(Continued)

OTHER PUBLICATIONS

Agarawal, A., Google AI Blog, "Automatic Photography with Google Clips," May 11, 2018, pp. 5; <https://ai.googleblog.com/2018/05/automatic-photography-with-google-clips.html>.
(Continued)

*Primary Examiner* — Michael W Choi
(74) *Attorney, Agent, or Firm* — Lando & Anastasi, LLP

(57) ABSTRACT

Techniques for manufacturing optimization using a multi-tenant machine learning platform are disclosed. A method for manufacturing optimization includes: obtaining physical sensor data, by a manufacturing device associated with a tenant of a multi-tenant machine learning platform; determining, by a machine learning spoke system associated with the tenant, a machine learning parameter based on at least the physical sensor data; preventing exposure of the first physical sensor data of the first manufacturing device to any other tenant of the multi-tenant machine learning platform; transmitting the machine learning parameter from the machine learning spoke system to a machine learning hub system of the multi-tenant machine learning platform; and updating, by the machine learning hub system, a multi-tenant machine learning model based at least on the machine learning parameter.

16 Claims, 4 Drawing Sheets

(58) Field of Classification Search
CPC .......... G06N 3/006; G06N 3/08; Y02P 90/02; Y02P 80/40; Y02P 10/25; B22F 12/90; B22F 10/85; B29C 64/386; B33Y 50/00
USPC ........................................................ 700/108
See application file for complete search history.

(56) References Cited

U.S. PATENT DOCUMENTS

| | | | | |
|---|---|---|---|---|
| 2020/0030915 | A1* | 1/2020 | Uozumi | B33Y 40/00 |
| 2020/0143006 | A1* | 5/2020 | Matusik | B29C 64/393 |
| 2020/0259896 | A1* | 8/2020 | Sachs | G07C 9/00174 |
| 2020/0358599 | A1* | 11/2020 | Baracaldo Angel | G06N 20/20 |
| 2021/0065891 | A1* | 3/2021 | Li | A61B 5/1123 |
| 2021/0166157 | A1* | 6/2021 | Bhowmick | G06N 20/20 |

OTHER PUBLICATIONS

McMahan B. et al., Google AI Blog, "Federated Learning: Collaborative Machine, Learning without Centralized Training Data," Apr. 7, 2017, pp. 4; <https://ai.googleblog.com/2017/04/federated-learning-collaborative.html>.

* cited by examiner

MANUFACTURING OPTIMIZATION USING A MULTI-TENANT MACHINE LEARNING PLATFORM

RELATED APPLICATIONS

This application claims the benefit of U.S. Provisional Patent Application Ser. No. 62/852,766, titled "ARCHITECTURE AND SYSTEM TO BUILD A CENTRALIZED MACHINE LEARNING PLATFORM WHILE MAINTAINING CONFIDENTIALITY OF CUSTOMER DATA," filed May 24, 2019, which is hereby incorporated by reference in its entirety.

BACKGROUND

In subtractive manufacturing, three-dimensional (3D) objects are manufactured by cutting away material from an initial block (or other shape) of material. For example, computer numeric controlled (CNC) machines may be initialized and tuned by an operator to create a particular part. Specifically, the operator may supply a program (e.g., using G-code) that instructs the machine how to make the part. An input material larger than the desired part is provided to the machine. The machine's tool (or multiple tools, depending on the machine) carves away the material, according to the program, to reveal the shape of the specified part. However, in some instances, the machine may create a part of unacceptably low quality. The operator may be required to modify the design, process code, and/or tooling to improve the part quality. The operator cannot predict all aspects of what will happen at each step of the manufacturing process, and accordingly such modifications are often reactive (i.e., in response to a poorly manufactured part) rather than proactive.

As one example, if a tool creates a surface defect referred to as chatter, a part surface that was intended to be smooth may instead turn out rippled like a washboard. Such defects may cause a range of problems. If the part is a sliding surface for a seal (e.g., in an automobile suspension system), the rough surface will wear out the seal and cause premature failure. Accordingly, the operator must adjust the program to eliminate the surface defect. The defect may result from one or more different causes. For example: the tool may have too high of an aspect ratio (i.e., the ratio of length to diameter of the tool); the tool may be moving too fast; the tool may be attempting to remove too much material in one pass; the part may not be held in place with sufficient strength to prevent vibration; and/or chatter may result from machine-to-machine variation in the stiffness of the machine frame. Accordingly, when an operator observes this defect, the specific cause(s) and corresponding solution(s) may not be obvious.

As additional examples, a CNC tool that is worn down will cut a smaller distance than a new tool, and a part that is not held firmly enough in the machine may require the operator to design and build a new part retention mechanism.

In the examples above and/or other situations, the operator may modify the programming to reach a solution that produces usable parts. However, the tools will wear down over the course of manufacturing parts, resulting in process drift. To continue producing parts of acceptable quality, the operator may need to continually monitor and update the process or tools.

In additive manufacturing, 3D parts are manufactured by adding layer-upon-layer of material. For example, an additive manufacturing based 3D printing device can create a 3D part, based on a digital representation of the part, by depositing a part material along toolpaths in a layer-by-layer manner. A print head of the 3D printing device or system carries a nozzle, which deposits the part material as a sequence of roads on a substrate in a build plane. The deposited part material fuses to previously deposited part material and is then solidified. The position of the print head relative to the substrate is then incremented along one or more print axes, and the process can then be repeated to form a 3D part resembling the 3D computer model.

An additive manufacturing process may produce a part, from a computer design file, with a range of defects. The part may be warped, which can result from one or more different causes. For example: the print bed temperature may be too low or too high; the nozzle temperature may be too low or too high; the selected tool deposition path may cause warpage; the print speed may be too fast or too slow; and/or the print acceleration may be too fast or too slow. Accordingly, when warpage occurs, the specific cause(s) and corresponding solution(s) may not be obvious.

In the examples above and/or other situations, an engineer may modify the design file (e.g., CAD file) and/or the 3D printer's programming to compensate for an error. However, due to many factors that affect part properties, the modification(s) needed may not be obvious. In addition, due to machine and component wear and the potential of solutions to cause other defects, an engineer may need to continually monitor and correct for problems.

Manufactured parts often undergo one or more post-processing steps before reaching their end use form. Such steps may include, for example: lapping, honing, facing, grinding, polishing, bead blasting, sintering, heat treatment, washing, tumbling, burnishing, reaming, deburring, anodizing, and/or case hardening. Each of these processes may change the part's dimensions and/or require specific features to be successful. As one example, to polish a part to a smooth finish, the part must have a sufficiently thick wall that the polishing does not wear through the part. As another example, a sintered part may shrink and its resulting dimensions may not match the design. A static design and printer programming cannot be expected to compensate for an arbitrary process or collection of processes.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to optimizing manufacturing such as 3D printing, CNC machining, and/or other kinds of manufacturing.

SUMMARY

One or more embodiments include techniques for optimizing manufacturing such as 3D printing, CNC machining, and/or other kinds of manufacturing. A hub-and-spoke multi-tenant machine learning platform allows for machine learning using data from multiple tenants, based on physical sensor data from manufacturing devices, while maintaining the privacy of each tenant's respective data. Components and techniques described herein allow for training a multi-tenant machine learning model to generate manufacturing optimizations without requiring tenants to send private data "out of house." In addition, techniques described herein may connect existing inspection equipment with manufacturing devices that are producing parts.

In general, in one aspect, a method includes: obtaining first physical sensor data, by a first manufacturing device associated with a first tenant of a multi-tenant machine learning platform; determining, by a first machine learning spoke system associated with the first tenant, a first machine learning parameter based on at least the first physical sensor data; preventing exposure of the first physical sensor data of the first manufacturing device to any other tenant of the multi-tenant machine learning platform; transmitting the first machine learning parameter from the first machine learning spoke system to a machine learning hub system of the multi-tenant machine learning platform; and updating, by the machine learning hub system, a multi-tenant machine learning model based at least on the first machine learning parameter. Obtaining the first physical sensor data may include obtaining data from a laser sensor of the first manufacturing device. Determining the first machine learning parameter may include executing computer-readable instructions, stored by the first printing machine and executable by one or more hardware processors of the first printing machine, that implement the first machine learning spoke system. The first manufacturing device may be a computer numerical control (CNC) machine or a three-dimensional (3D) printer.

The method may further include: obtaining second physical sensor data, by a second manufacturing device associated with a second tenant of the multi-tenant machine learning platform; determining, by a second machine learning spoke system associated with the second tenant, a second machine learning parameter based on at least the second physical sensor data; preventing exposure of the second physical sensor data of the second manufacturing device to any other tenant of the multi-tenant machine learning platform; transmitting the second machine learning parameter from the second machine learning spoke system to the machine learning hub system; and updating, by the machine learning hub system, the multi-tenant machine learning model based at least on the second machine learning parameter.

The method may further include: executing the multi-tenant machine learning model to determine a manufacturing optimization; and adjusting a second manufacturing device, associated with a second tenant of the multi-tenant learning platform, based at least on the manufacturing optimization. The method may further include: transmitting the manufacturing optimization from the machine learning hub system to a second machine learning spoke system associated with the second tenant, wherein adjusting the second manufacturing device is performed by the machine learning spoke system responsive to receiving the manufacturing optimization from the machine learning hub system. The second tenant may be subscribed to obtain the manufacturing optimization without contributing any machine learning parameter to the machine learning hub system.

In general, in one aspect, a system includes a first one or more processors and a first one or more non-transitory computer-readable media storing instructions. The instructions, when executed by the first one or more processors, cause a first machine learning spoke system associated with a first tenant of a multi-tenant machine learning platform to perform operations including: obtaining first physical sensor data from a first manufacturing device; determining a first machine learning parameter based on at least the first physical sensor data; preventing exposure of the first physical sensor data of the first manufacturing device to any other tenant of the multi-tenant machine learning platform; and transmitting the first machine learning parameter to a machine learning hub system of the multi-tenant machine learning platform, wherein the machine learning hub system is configured to update a multi-tenant machine learning model based at least on the first machine learning parameter. The first one or more processors and the first one or more non-transitory computer-readable media may be components of the first manufacturing device. The first manufacturing device may be a computer numerical control (CNC) machine or a three-dimensional (3D) printer.

The system may further include a second one or more processors and a second one or more non-transitory computer-readable media storing instructions that, when executed by a second one or more processors, cause a second machine learning spoke system associated with a second tenant of the multi-tenant machine learning platform to perform operations including: obtaining second physical sensor data from a second manufacturing device; determining a second machine learning parameter based on at least the second physical sensor data; preventing exposure of the second physical sensor data of the second manufacturing device to any other tenant of the multi-tenant machine learning platform; and transmitting the second machine learning parameter to the machine learning hub system of the multi-tenant machine learning platform, wherein the machine learning hub system is further configured to update the multi-tenant machine learning model based at least on the second machine learning parameter.

The system may further include a second one or more processors and a second one or more non-transitory computer-readable media storing instructions that, when executed by a second one or more processors, cause a second machine learning spoke system associated with a second tenant of the multi-tenant machine learning platform to perform operations including: receiving a manufacturing optimization, generated using the multi-tenant machine learning model, from the machine learning hub system; and adjusting a second manufacturing device based at least on the manufacturing optimization. The second tenant may be subscribed to obtain the manufacturing optimization without contributing any machine learning parameter to the machine learning hub system.

In general, in one aspect, a system includes one or more processors and one or more non-transitory computer-readable media storing instructions that, when executed by the one or more processors, cause a machine learning hub system of a multi-tenant machine learning platform to perform operations including: receiving a first machine learning parameter from a first machine learning spoke system associated with a first tenant of the multi-tenant machine learning platform, the first machine learning parameter having been generated by the first machine learning spoke system based at least on first physical sensor data obtained from a first manufacturing device; preventing exposure of the first physical sensor data of the first manufacturing device to any other tenant of the multi-tenant machine learning platform; and updating a multi-tenant machine learning model based at least on the first machine learning parameter. The first manufacturing device may be a computer numerical control (CNC) machine or a three-dimensional (3D) printer.

The one or more non-transitory computer-readable media may further store instructions that, when executed by the one or more processors, cause the machine learning hub system to perform operations including: receiving a second machine learning parameter from a second machine learning spoke system associated with a second tenant of the multi-tenant machine learning platform, the second machine learning parameter having been generated by the second machine learning spoke system based at least on second physical sensor data obtained from a second manufacturing device; preventing exposure of the second physical sensor data of the second manufacturing device to any other tenant of the multi-tenant machine learning platform; and updating the multi-tenant machine learning model based at least on the second machine learning parameter. Updating the multi-tenant machine learning model based at least on the first machine learning parameter and updating the multi-tenant machine learning model based at least on the second machine learning parameter may include: computing a machine learning adjustment as a function of both the first machine learning parameter and the second machine learning parameter; and updating the multi-tenant machine learning model based on the machine learning adjustment.

The one or more non-transitory computer-readable media may further store instructions that, when executed by the one or more processors, cause the machine learning hub system to perform operations including: executing the multi-tenant machine learning model to determine a manufacturing optimization; and transmitting the manufacturing optimization to a second machine learning spoke system associated with a second tenant of the multi-tenant machine learning platform, wherein the second machine learning spoke system uses the manufacturing optimization to adjust a second manufacturing device. The second tenant may be subscribed to obtain the manufacturing optimization without contributing any machine learning parameter to the machine learning hub system.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1:
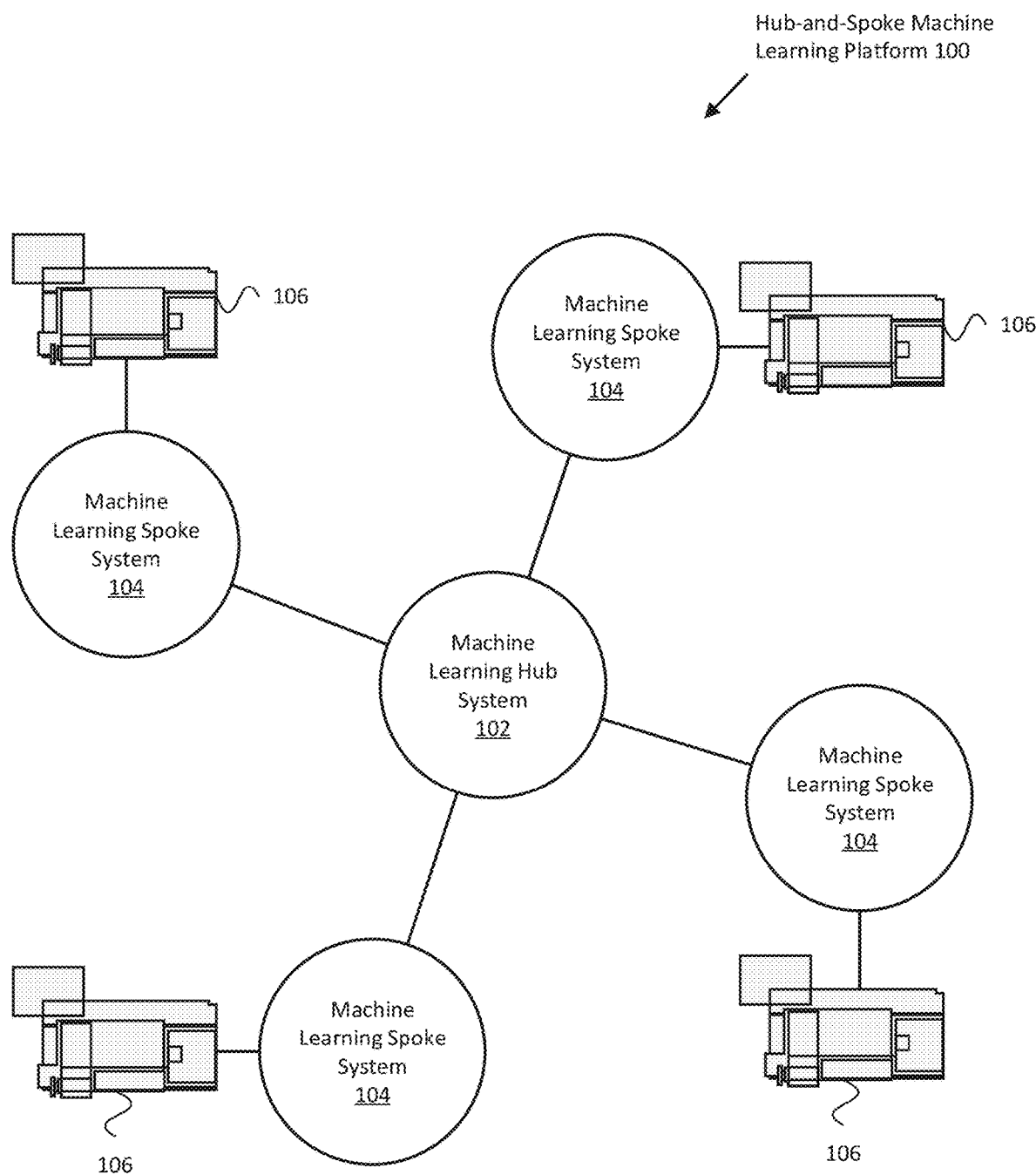
FIG. 1 is a block diagram of an example of a hub-and-spoke machine learning platform according to an embodiment.

As the world creates increasingly large amounts of data—much of which is consolidated in large data sets sometimes referred to as "big data"—people and organizations (e.g., companies, government entities, educational institutions, etc.) seek ways to process and utilize the data efficiently. Machine learning, sometimes considered a form of artificial intelligence or A.I., has emerged as one approach to processing and utilizing data.

In a typical machine learning process, a model is initialized in a random state. The model is then tuned/trained using a set of training data. The training allows the model to make predictions, classify, and/or otherwise process subsequent data sets. Accordingly, larger sets of training data are generally preferred. However, obtaining large sets of training data may conflict with concerns about privacy and/or control of data dissemination (e.g., with respect to confidential, proprietary, and/or otherwise private data of a customer, patient, etc.).

The healthcare industry provides one example of the tradeoff between privacy concerns and data robustness for machine learning. For example, a hospital may want to use machine learning to provide better healthcare for its patient population. To improve the quality of machine learning for patient healthcare, a larger set of training data is preferable. In addition, the patients' medical records would typically be a good source of data for training a machine learning model. The hospital has access to detailed medical records of each patient, each of whom has consented to allowing the hospital to access and use the data for limited purposes. However, patients may not want their medical data stored in a data warehouse (e.g., a centralized or distributed data store) that may present a more attractive target for data theft. Thus, the desire to build a robust machine learning system for healthcare services may be at odds with the patients' desire for privacy.

The retail industry provides another example of the tradeoff between privacy concerns and data robustness for machine learning. For example, a shopper may not want a retailer to maintain a database of their retail shopping behaviors (e.g., store visits, purchase histories, etc.). Such high-resolution tracking of shopping behaviors could be accessed by unauthorized entities and/or used for malicious or otherwise unapproved purposes. At the same time, such data would be useful to provide customers with more personalized shopping experiences. For example, data analysis may find a trend of a particular customer to prefer blue clothing. That customer may be amenable to receiving promotional offers (e.g., discounts) on blue clothing, provided that the advertiser does not have access to the customer's detailed shopping records.

The manufacturing industry also provides an example of the tradeoff between privacy concerns and data robustness. As described above, manufacturing (e.g., subtractive or additive manufacturing) can present a variety of challenges that are difficult to predict and/or resolve. As such, manufacturing processes may benefit (e.g., in accuracy and consistency) by the accumulation and analysis of manufacturing data from multiple sources. However, training a traditional machine learning model may require companies using a particular product to provide confidential and proprietary product data, and associated manufacturing data, to a centralized data warehouse. The design files for a product (e.g., computer-aided design (CAD) files), are often considered highly valuable and may provide a company with a competitive advantage over its competitors. Many companies may not be comfortable sharing such information, and may therefore be unwilling to provide the information needed for traditional machine learning.

Platform

Components and techniques described herein allow for training a multi-tenant machine learning model to generate manufacturing optimizations, without requiring tenants to send private data "out of house." More specifically, as described herein, a hub-and-spoke multi-tenant machine learning platform allows for machine learning using data from multiple tenants, based on physical sensor data from manufacturing devices, while maintaining the privacy of each tenant's respective data.

FIG. 1 is a block diagram of an example of a hub-and-spoke machine learning platform 100 (referred to hereinafter as a "platform") according to an embodiment. In an embodiment, the platform 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the platform 100 includes a machine learning hub system 102 (referred to hereinafter as a "hub system") and multiple machine learning spoke systems 104 (referred to hereinafter as "spoke systems"). Each spoke system 104 is associated with a tenant of the hub system 102. In addition, each spoke system 104 is configured to obtain data associated with at least one manufacturing device 106.

In an embodiment, a spoke system 104 is communicatively coupled with a manufacturing device 106. A spoke system 104 may be part of a manufacturing device 106, for example, as computer-readable instructions stored by a manufacturing device 106 and executable by one or more processors of the manufacturing device 106. In FIG. 1, the manufacturing devices 106 are illustrated as CNC machines. However, the manufacturing devices 106 may be different kinds of devices, or a mixture of different kinds of devices. For example, some or all of the manufacturing devices 106 may be 3D printers (e.g., fused filament fabrication (FFF) printers, fused deposition modeling (FDM) printers, stereolithography (SLA) printers, direct metal laser sintering (DMLS) printers, and/or another kind of 3D printer). One or more of the devices 106 may include a computer-aided mill and/or lathe. Alternatively or additionally, the manufacturing devices 106 may include a mixture of models and/or configurations of the same kind of device. For example, the manufacturing devices 106 may include different models and configurations of CNC machines and/or 3D printers. A particular spoke system 104 may be associated with multiple devices, which may not necessarily be of the same kind. While FIG. 1 illustrates four separate spoke systems 104, the platform 100 may include any number of spoke systems 104.

In an embodiment, the hub system 102 includes a multi-tenant machine learning model, described in further detail below. The hub system 102 is configured to learn from tenant-specific training performed at each of the spoke systems 104, without the hub system 102 requiring access to the data that is for training by the spoke systems 104.

Information Sharing Model

In an embodiment, different tenants may have different subscription agreements with the hub system 102. For example, the tenants may include contributing and non-contributing tenants. A contributing tenant is a tenant that contributes tenant-specific machine learning parameters (e.g., edge weights, as described in further detail below) to the hub system 102. A non-contributing tenant is a tenant that does not contribute tenant-specific machine learning parameters to the hub system 102. A non-contributing tenant may nonetheless be able to subscribe to receive manufacturing optimizations from the hub system 102. A non-contributing tenant may thus benefit from systemic improvements contributed by other tenants, without those other tenants having the benefit of any tenant-specific learning performed by the non-contributing tenant. In a paid subscription model, non-contributing tenants may be required to pay more (e.g., on a monthly, annual, and/or metered basis) than contributing tenants.

In an embodiment, two or more tenants may be segmented into a group of tenants that shares data with each other but not with other tenants. For example, two of the spoke systems 104 may be part of a group (e.g., group "alpha") that shares tenant-specific machine learning parameters with each other, without sharing tenant-specific machine learning parameters with the other spoke systems 104. The spoke systems 104 excluded from group alpha may each operate independently, as described above, or may form another group (e.g., group "beta") that shares tenant-specific machine learning parameters with each other and not with members of group alpha. Members of a group may share data with each other via a direct connection, using peer-to-peer routing, and/or by routing the data through the hub system 102. Members of a group may be contributing tenants and/or non-contributing tenants with respect to the hub system 102. In one example, members of a group are non-competing businesses that do not risk losing a competitive advantage by sharing with each other.

In an embodiment, one or more components of the platform 100 include a user interface (not shown). In general, a user interface refers to hardware and/or software configured to facilitate communications between a user and a computer system or subsystem (e.g., the hub system 102, a spoke system 104, and/or a manufacturing device 106). A user interface renders user interface elements and receives input via user interface elements. A user interface may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface may be specified in one or more other languages, such as Java, Python, Perl, C, C++, and/or any other language or combination thereof.

In an embodiment, one or more components of the platform 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
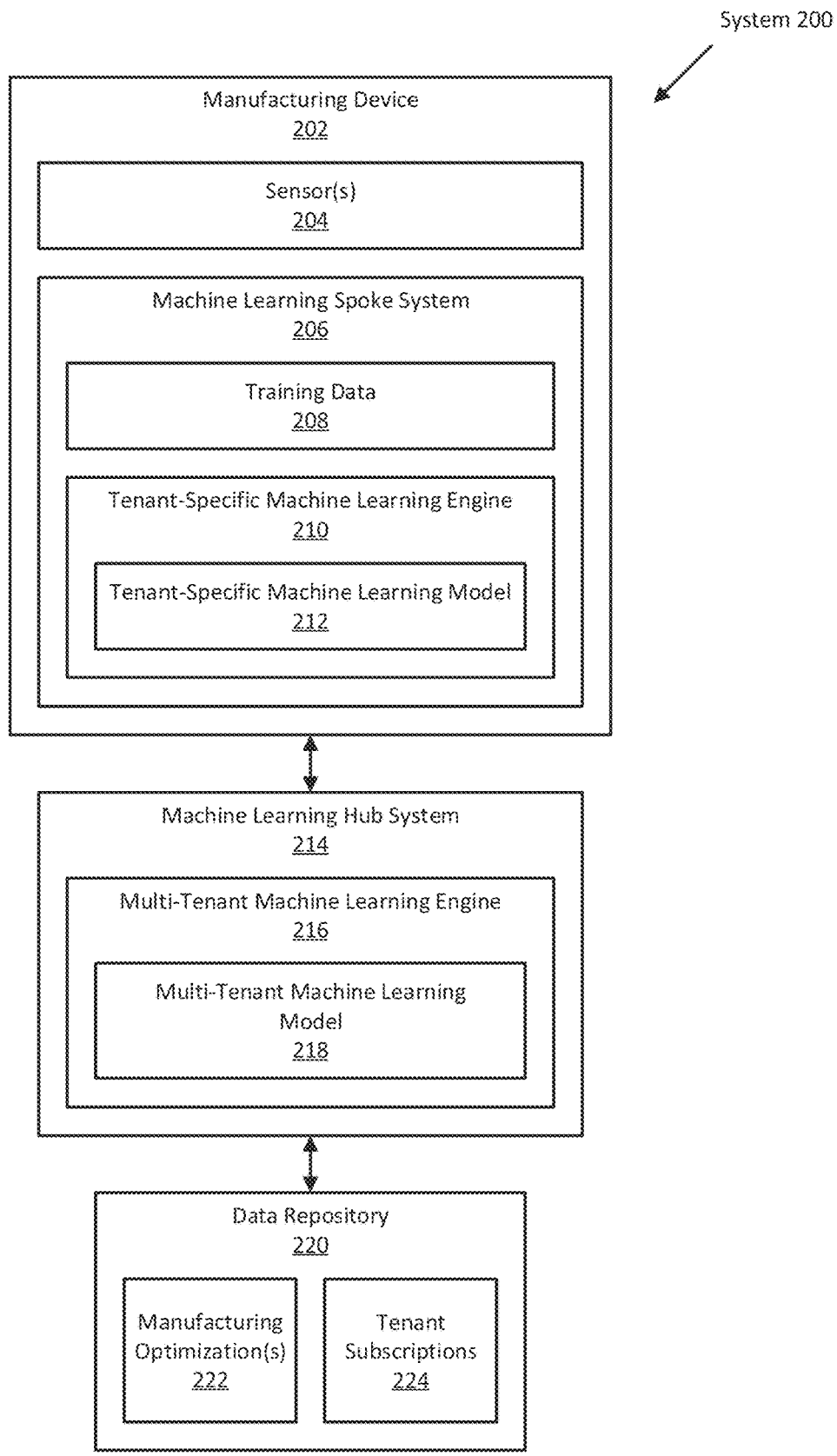
FIG. 2 is a block diagram of an example of a system according to an embodiment.

FIG. 2 is a block diagram of an example of a system 200 according to an embodiment. In an embodiment, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

Sensory Accessible Data and Information

In an embodiment, a manufacturing device 202 (which may correspond to a manufacturing device 106 of FIG. 1) includes one or more sensors 204. A sensor 204 is a physical device configured to obtain data relating to manufacturing, as described in further detail below. The sensor(s) 204 may include a laser, a scale, an infrared sensor, a tilt sensor, an accelerometer, an optical sensor, a photoelectric sensor, a microphone, a pressure sensor, a fluid level sensor, a current sensor, a metal detector, a humidity sensor, a thermometer, a flow sensor, and/or another kind of sensor or combination thereof. A sensor 204 may be configured to obtain sensor data before, during, and/or after a manufacturing process.

In an embodiment, a machine learning spoke system 206 (referred to hereinafter as a "spoke system") refers to hardware and/or software configured to perform tenant-specific machine learning as described herein. As illustrated in FIG. 2, one or more components of the spoke system 206 may be part of the manufacturing device 202. For example, the manufacturing device 202 may store computer-readable instructions that, when executed by one or more processors of the manufacturing device 202, cause operations of the spoke system 206. Alternatively, one or more components of the spoke system 206 may be physically separate from the manufacturing device 202. For example, the spoke system 206 may be a cloud-hosted service communicatively coupled with the manufacturing device 202. The manufacturing device 202 may be communicatively coupled with another computer system (not shown) that performs operations of the spoke system 206 and/or communicates with a cloud-hosted service that performs some or all of the operations.

In an embodiment, the spoke system 206 is configured to store training data 208. Training data 208 includes data used by a tenant-specific machine learning engine 210 to train a tenant-specific machine learning model 212. The training data 208 may include sensor data obtained by a sensor 204 and/or other kinds of data obtained from other sources. The training data 208 may include metadata collected from manufactured parts, such as from printed 3D parts. In general, the training data 208 may include data relating to: file parameters (e.g., designed geometry and/or machine settings); post-manufactured part geometry; tooling paths (e.g., directions, velocities, and/or temperatures); input material(s); processing tool(s); processing steps; post-processing part geometry; ambient conditions (e.g., temperature, humidity, elevation, and/or air flow); and/or other kinds of data. Training data 208 may relate to any kind of characteristic, including but not limited to quality, shape, dimensions, etc., from start to finish of a manufacturing process. As additional examples, training data 208 may include part geometry measured during manufacture, the condition or state of a printer or other manufacturing device (e.g., how many print hours, when a consumable was replaced, etc.), sensor data collected during part manufacture (e.g., print head nozzle pressure, axial encoder readings, filament consumption rate, etc.), and/or data gathered from measurements of fiducials for calibration before and/or during the manufacturing process and printer health monitoring (e.g., pre-print bed scans and bead scans).

In an embodiment, training data 208 may integrate data from sensors of existing inspection equipment, which may not be specifically designed for machine learning approaches described herein. The inspection equipment may produce data relevant to manufacturing, whether or not that equipment is part of the manufacturing device. For example, data may be obtained from a laser, FaroArm, camera, touch-off probe, x-ray, compositional analysis, thermal data, and/or any other kind of relevant data, even if the inspection equipment (e.g., sensor and associated hardware) is not configured to share data with the manufacturing device directly. Data from such inspection equipment may be incorporated into training data 208, to provide feedback on the manufacturing device, materials, and/or process. As one example, a 3D printing device may be placed into a general-purpose computerized tomography (CT) scanner that provides in situ feedback. In general, training data 208 may incorporate data from any kind of device providing sensor data and/or other feedback relevant to machine learning approaches described herein. A tenant may be able to selectively indicate (e.g., via a user interface), from available data sources, which data to include in the training data 208. Data that is useful to one tenant may not be as useful to another tenant.

In general, the training data 208 may include data relating to one or more parameters of particular interest for machine learning purposes, which may include (but are not limited to) one or more of: part geometry; hardness; material properties; density; material composition; water; content; crystallinity; and/or another parameter or combination thereof.

If the manufacturing device 202 is a subtractive manufacturing device, the training data 208 may include data relating to: cutting speed; cutting feed; spindle speed; feed rate; axial depth of cut; radial depth of cut; plunge feed rate; step depth; engraving tool geometry; engraving tool material(s); engraving tool coating; machine stiffness; setup stiffness; spindle vibration; work holding vibrations; and/or other kinds of data relating to subtractive manufacturing devices, materials, and/or processes.

Qualification of Parts

Many manufacturing processes include a part qualification process. In part qualification, a human inspector (e.g., operator, engineer, quality assurance professional, etc.) compares a partially or wholly manufactured part with a set of acceptance criteria. Alternatively or additionally, an automated inspection process (e.g., using one or more sensors configured to measure part geometry and/or other properties) may be used. The inspector either approves or rejects the part (e.g., a form of "thumbs up" or "thumbs down" review), before allowing the part to proceed to the next step (e.g., post-processing, packaging, and/or shipping, depending on the kind of part and the stage of manufacturing where the inspection occurs). The part approval or rejection may be an important piece of data for machine learning, because it represents a classification of the part (e.g., as satisfactory or unsatisfactory) given all the inputs to the process. If the inspection is viewed as a classification equation, all the inputs inform the left-hand side of the equation and the up/down classification informs the right-hand side of the equation. Alternatively, the inspection may provide a classification beyond satisfactory/unsatisfactory. For example, the inspector may compare the part with multiple sets of criteria (i.e., relating to different qualities of the part) and classify the part separately for each set of criteria. Alternatively or additionally, the classification may be non-binary, i.e., have more than two possible results, such as a score on a predetermined scale, a letter grade, etc. The inspector may provide observations to qualify the classification (e.g., a manufactured part appears under-extruded or over-extruded). The inspector may provide information about the service life of a part (e.g., a part exceeded its service life or failed prematurely). In some cases, the inspector may be able to provide a part with a marginal pass (e.g., for a manufacturer that sell parts with non-critical defects at a lower cost). Some or all of the inspection results may be included in the training data 208.

If the manufacturing device 202 is an additive manufacturing device, the training data 208 may include data relating to: print rate; print acceleration; three-dimensional shell geometry; three-dimensional shell direction; infill geometry; infill density; printer temperature; printer hardware specifications; input material composition(s); input material geometry; nozzle composition material; nozzle geometry; nozzle coating; laser power; laser energy; moisture content in the material; hardness of a part after manufacturing; metallurgical composition of a part after manufacturing; carbon content of a part; and/or other kinds of data relating to additive manufacturing devices, materials, and/or processes.

Learning Model for Optimization

In embodiment, a tenant-specific machine learning engine 210 (referred to herein as a "tenant-specific engine") refers to hardware and/or software configured to train a tenant-specific machine learning model 212 (referred to hereinafter as a "tenant-specific model") to perform one or more operations, e.g., optimizing for one or more manufacturing parameters. Some non-limiting examples of manufacturing optimizations are described herein.

In an embodiment, training the tenant-specific model 212 uses training data 208 to generate a function that, given one or more inputs to the tenant-specific model 212, computes a corresponding output. The output may correspond to a prediction based on prior machine learning. In an embodiment, the output includes a label, classification, and/or categorization assigned to the provided input(s). The tenant-specific model 212 corresponds to a learned model for performing the desired operation(s) (e.g., labeling, classifying, and/or categorizing inputs). A system 200 may use multiple tenant-specific engines 210 and/or multiple tenant-specific models 212 for different purposes.

In an embodiment, the tenant-specific engine 210 may use supervised learning, semi-supervised learning, unsupervised learning, reinforcement learning, and/or another training method or combination thereof. In supervised learning, the training data 208 includes input/output pairs in which each input is labeled with a desired output (e.g., a label, classification, and/or categorization), also referred to as a supervisory signal.

In an embodiment, classification criteria may vary between tenants. Classification criteria may vary between tenants in different industries that classify and process parts differently. For example, the aerospace industry typically has more requirements, stricter requirements, and tighter tolerances than the automotive industry. Alternatively or additionally, different tenants (perhaps even within the same industry) may value different characteristics differently. For example, one tenant may prefer to value mechanical properties over dimensional accuracy; or different tenants may cater to different segments of the same industry (e.g., professional vs. consumer electronics). An operator of the multi-tenant machine learning platform described herein may specify classification criteria for some or all tenants, between industries and/or based on other criteria. Alternatively or additionally, tenants may be able to specify classification criteria that differ from other tenants. For example, a spoke system may include a user interface that allows a tenant to specify classification criteria that are different from baseline or default criteria. Accordingly, a machine learning model that is optimized to classify for one tenant may differ significantly from a machine learning model that is optimized to classify for another tenant using different classification criteria, even if the two models were given the same inputs/sensor data.

In semi-supervised learning, some inputs are associated with supervisory signals and other inputs are not associated with supervisory signals. In unsupervised learning, the training data does not include supervisory signals. Reinforcement learning uses a feedback system in which the tenant-specific engine 210 receives positive and/or negative reinforcement in the process of attempting to solve a particular problem (e.g., to optimize performance in a particular scenario, according to one or more predefined performance criteria). In an embodiment, the tenant-specific engine 210 initially uses supervised learning to train the tenant-specific model 212 and then uses unsupervised learning to update the tenant-specific model 212 on an ongoing basis.

In an embodiment, a tenant-specific engine 210 may use many different techniques to label, classify, and/or categorize inputs. A tenant-specific engine 210 may transform inputs into feature vectors that describe one or more properties ("features") of the inputs. The tenant-specific engine 210 may label, classify, and/or categorize the inputs based on the feature vectors. Alternatively or additionally, a tenant-specific engine 210 may use clustering (also referred to as cluster analysis) to identify commonalities in the inputs. The tenant-specific engine 210 may group (i.e., cluster) the inputs based on those commonalities. The tenant-specific engine 210 may use hierarchical clustering, k-means clustering, and/or another clustering method or combination thereof. In an embodiment, a tenant-specific engine 210 includes an artificial neural network. An artificial neural network includes multiple nodes (also referred to as artificial neurons) and edges between nodes. Edges may be associated with corresponding weights that represent the strengths of connections between nodes, which the tenant-specific engine 210 adjusts as machine learning proceeds. Alternatively or additionally, a tenant-specific engine 210 may include a support vector machine. A support vector machine represents inputs as vectors. The tenant-specific engine 210 may label, classify, and/or categorize inputs based on the vectors. Alternatively or additionally, the tenant-specific engine 210 may use a naïve Bayes classifier to label, classify, and/or categorize inputs. Alternatively or additionally, given a particular input, a tenant-specific model 212 may apply a decision tree to predict an output for the given input. Alternatively or additionally, a tenant-specific engine 212 may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

As one example, the spoke system 206 may receive a copy of the tenant-specific model 212 from a machine learning hub system 214 (described in further detail below, and for ease of discussion referred to hereinafter as a "hub system"). As received, the tenant-specific model 212 may be initialized in a baseline state. Other spoke systems may also receive copies of the tenant-specific model 212 initialized in the same baseline state. In an embodiment, the baseline state includes a neural network with a baseline network topology and baseline edge weights. The tenant-specific engine 210 trains its respective copy of the tenant-specific model 212, using the training data 208, thus modifying the weights in the neural network. Specifically, the tenant-specific engine 210 modifies the weights to optimize for one or more manufacturing-related criteria, expressed as a function. The spoke system 206 may be configured to transmit the modified weights to the hub system 214, to be used by a multi-tenant machine learning engine 216 (referred to hereinafter as a "multi-tenant engine") to adjust a multi-tenant machine learning model 218 (referred to hereinafter as a "multi-tenant model"). The multi-tenant machine 216 may be configured to use the same machine learning techniques as the tenant-specific machine 210 and/or different techniques.

In an embodiment, the spoke system 206 may periodically receive new weights from the hub system 214, corresponding to adjustments to the multi-tenant model 218. The spoke system 206 may further be configured to evaluate the performance impact of the new weights received from the hub system 214. For example, the spoke system 206 may maintain a testing dataset (which may include "live" data and/or data designated for testing purposes only) and use the testing dataset to evaluate the performance impact of the new weights on the tenant-specific model 212. In the case of multiple new weights, the spoke system 206 may test each new weight independently and/or simultaneously. The results of the testing may determine which (if any) of the new weights to incorporate into the tenant-specific model 212. The spoke system 206 may search a parameter space associated with the tenant-specific model 212, to determine which weight changes improve or degrade performance, to selectively determine which weight change(s) to keep or reject. Alternatively or additionally, the spoke system 206 may be configured to check its machine learning results against the hub system 214, to determine if the results are reasonable. For example, given a set of inputs, if the tenant-specific engine 210 produces a significantly different prediction or classification than the multi-tenant model 218, the spoke system 206 may be poorly configured and/or operating from poor data (e.g., if the manufacturing device 202 or a sensor 204 is in a degraded or failed state and therefore producing inaccurate and/or unreliable data). Alternatively or additionally, the spoke system 206 may be configured to compare the tenant-specific model 210 with the multi-tenant model 218 (e.g., by comparing weights between corresponding nodes in respective neural networks) and determine whether they differ by more than an expected margin. An excessive difference between the two models may similarly indicate a poorly configured, degraded, or failed component. In such cases, the spoke system 206 may be configured to generate an alert that prompts a human operator or engineer to inspect the spoke system 206, to determine the cause(s) of the discrepancy.

In an embodiment, the hub system 214 is configured to receive machine learning parameters from the spoke system 206. For example, if neural networks are used, the machine learning parameters may include adjusted edge weights. Other kinds of machine learning may use different kinds of machine learning parameters, and embodiments should not be considered limited to neural networks and/or edge weights. As described above, the hub system 214 and the spoke system 206 may be parts of a hub-and-spoke machine learning platform that includes multiple spoke systems (not shown in FIG. 2). The hub system 214 may receive machine learning parameters from multiple spoke systems. The multi-tenant engine 216 may be configured to algorithmically combine the received machine learning parameters, to update the parameters of the multi-tenant model 218. For example, the multi-tenant engine 216 may be configured to compute an average, mean, or other function of the received parameters and/or the parameters already included in the multi-tenant model 218. In this manner, the machine learning from multiple spoke systems (e.g., spoke system 206) is consolidated into the hub system 214, without the hub system 214 needing access to the distributed training data sets that are used to train the spoke models. In addition, the hub system 214 may be configured to transmit updated machine learning parameters to the spoke systems, to be evaluated against a testing dataset as described above. In this manner, the hub system 214 may propagate system knowledge, obtained from machine learning performed across multiple tenants' respective training data, without requiring the spoke system 206 to expose its training data to other spoke systems and/or the hub system 214.

In an embodiment, the multi-tenant engine 216 is configured to generate a manufacturing optimization 222 using the multi-tenant model 218. A manufacturing optimization 222 refers to an improvement to an existing manufacturing device (e.g., manufacturing device 202), material, or process. For example: manufacturing optimization 222 may include information about locations for intentional markings designed on the surface of a part, to aid in alignment without deleterious harm to the final part; and/or stepover may be designed to be asymmetrical, to facilitate the orientation indexing of a part. Additional examples of manufacturing optimizations 222 are described below. As used herein, the term "optimization" does not necessarily indicate a theoretical or mathematically optimal result. Rather, an "optimization" represents a best effort at improving a device, material, or process based on the available training data and machine learning infrastructure.

In an embodiment, the hub system 214 is configured to manage tenant subscriptions 224. Tenant subscriptions 224 refer to data that indicates, for each tenant, whether that tenant is subscribed to contribute machine learning parameters and/or receive manufacturing optimizations 222. Depending on a particular tenant's subscription, the hub system 214 may regulate the flow of data to and from that tenant's spoke system accordingly.

In an embodiment, a data repository 220 is any type of storage unit and/or device (e.g., a file system, database, collection of tables, or any other storage mechanism) for storing data. A data repository 220 may include multiple different storage units and/or devices. The multiple different storage units and/or devices may or may not be of the same type or located at the same physical site. Further, a data repository 220 may be implemented or may execute on the same computing system as one or more other components of the platform 100. Alternatively or additionally, a data repository 220 may be implemented or executed on a computing system separate from one or more other components of the platform 100. A data repository 220 may be logically integrated with one or more other components of the platform 100. Alternatively or additionally, a data repository 220 may be communicatively coupled to one or more other components of the platform 100 via a direct connection or via a network. In FIG. 2, a data repository 220 is illustrated as storing various kinds of information. Some or all of this information may be implemented and/or distributed across any of the components of the platform 100. However, this information is illustrated within the data repository 220 for purposes of clarity and explanation.

Figure 3:
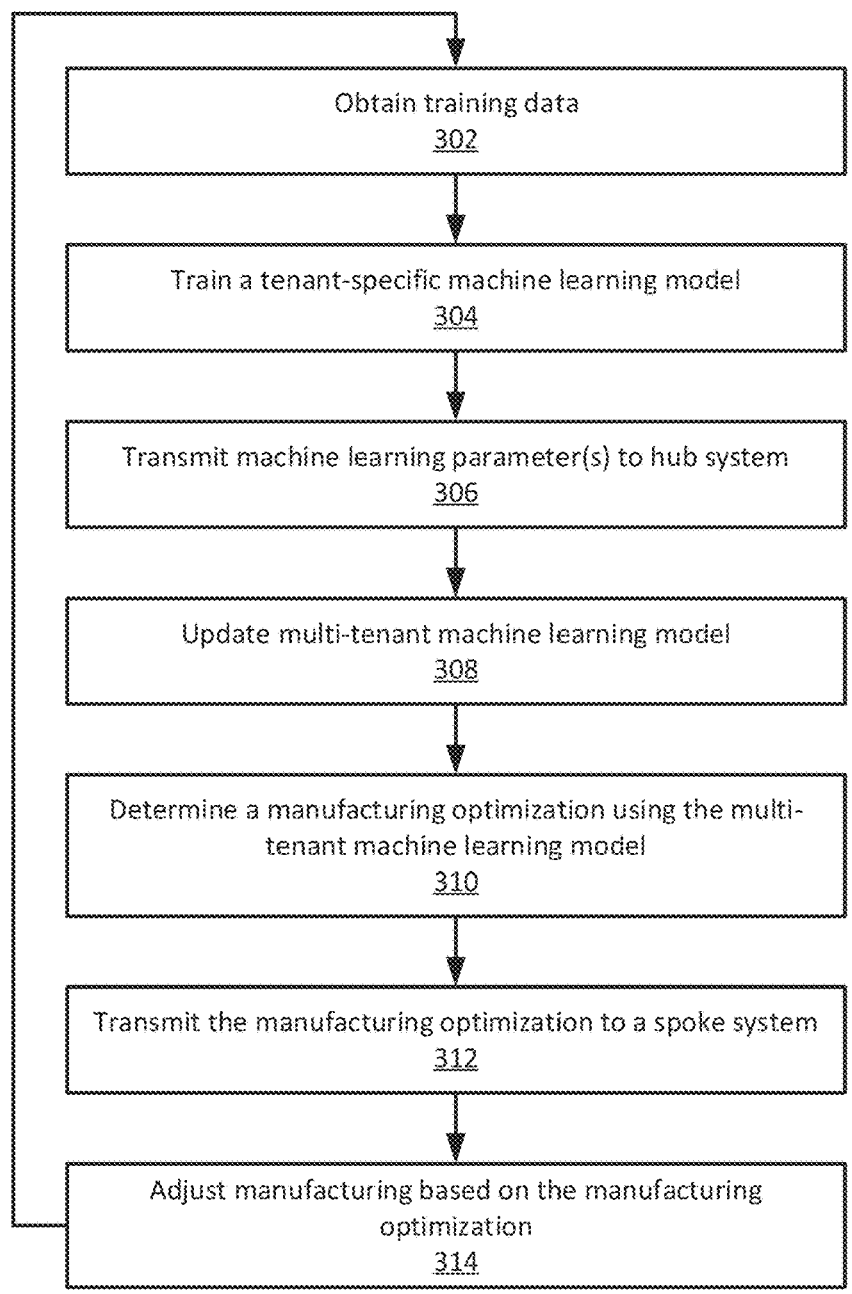
FIG. 3 is a flow diagram of an example of operations for manufacturing optimizations using a multi-tenant machine learning platform, according to an embodiment.

FIG. 3 is a flow diagram of an example of operations for manufacturing optimization using a multi-tenant machine learning platform, according to an embodiment. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a spoke system obtains training data (Operation 302). As described above, some or all of the training data may be physical sensor data. In general, the training data relates to one or more manufacturing devices, materials, and/or processes. The spoke system trains a tenant-specific model based on the training data (Operation 304). Examples of tenant-specific machine learning techniques are described above. Training the tenant-specific model produces adjusted machine learning parameters (e.g., edge weights in the case of a neural network). The machine learning parameters correspond to learned optimizations based on the tenant-specific training data. The spoke system transmits the machine learning parameters to the hub system (Operation 306). As described above, in some subscription models, a spoke system may not transmit machine learning parameters to the hub system; however, the hub-and-spoke machine learning platform is premised on at least a subset of spoke systems contributing to multi-tenant machine learning. The hub system updates a multi-tenant model based on the machine learning parameters received from the spoke system (Operation 308). As described above, the hub system may update the multi-tenant model based on machine learning parameters received from multiple spoke systems. The hub system may perform each update independently and/or may algorithmically combine parameters received from multiple spoke systems before updating the multi-tenant model.

In an embodiment, the hub system determines a manufacturing optimization using the multi-tenant model (Operation 310). The hub system may determine the manufacturing optimization responsive to a request from a tenant. For example, a tenant may supply "live" manufacturing data and request an optimization based on the data. Alternatively or in addition, the hub system may be configured to independently produce optimizations, to proactively improve manufacturing devices, materials, and/or processes. For example, the hub system may be configured to determine optimal conditions for preventative maintenance and/or repairs, in order to preemptively instruct a spoke system to automatically take action (e.g., to automatically adjust one or more parameters that affect the operation of a manufacturing device) and/or alert an operator or engineer to take action in advance of an adverse event.

In an embodiment, the hub system transmits the manufacturing optimization to a spoke system (Operation 312). The hub system may transmit the same manufacturing optimization to multiple spoke systems. For example, if the manufacturing optimization is for a particular kind of device or device configuration, the hub system may transmit the manufacturing optimization to spoke systems associated with that kind of device or device configuration. Responsive to receiving the manufacturing optimization, a spoke system may adjust manufacturing based on the manufacturing optimization (Operation 314). Alternatively or additionally, the spoke system may raise an alert so that an operator or engineer can manually implement the manufacturing optimization.

In an embodiment, multi-tenant machine learning is an iterative process. As described above, the hub system may transmit updated machine learning parameters to spoke systems, which may then continue to train tenant-specific models using the updates. As described above, a spoke system may test an update received from the hub system, to determine whether to accept a particular update and prevent reductions in tenant-specific performance.

DETAILED EXAMPLES

Detailed examples are described below for purposes of clarity. Components and/or operations described below should be understood as examples that may not be applicable to one or more embodiments. Accordingly, components and/or operations described below should not be construed as limiting the scope of one or more embodiments.

In a first example, multi-tenant machine learning is used to fix print head jams in a printer. Tenant-specific training data may include sensor data such as jam rates and idler head data (e.g., material draw rate) and other manufacturing data such as material specifications. In this example, multi-tenant machine learning determines manufacturing optimizations such as changes in material production and/or printer settings, to avoid and/or mitigate print head jams.

In a second example, multi-tenant machine learning is used to address extrusion problems in a printer. Tenant-specific training data may include sensor data such as data from the idler wheel (e.g., amount of material commanded and amount of material actually extruded). In this example, multi-tenant machine learning determines manufacturing optimizations such as preventative maintenance (e.g., based on a predicted/learned wear state of the print head) and/or avoidance by designing new pathing or tooling that reduces extrusion problems.

In a third example, multi-tenant machine learning is used to address beadscan issues (e.g., in printers with lasers but not an idler wheel). A printer may plan a path for a bead of material, print a bead of material, and scan the printed bead. Tenant-specific training data may include sensor data from multiple scans, which provides information about the relationship between what was commanded to be extruded and what was actually extruded. In this example, multi-tenant machine learning determines manufacturing optimizations such as adjusting extrusion based on printer offset, adjustments to the material manufacturing process to reduce material variability, and/or adjustments to the manufacturing device such as changing the printing height of the first layer. In the case of unexpected printing results (i.e., as determined based on sensor data), the system may instruct the device to fail the print rather than proceeding.

In a fourth example, multi-tenant machine learning is used to address gantry and bed-level scan issues with a printer. Such issues may relate, for example, for misalignments (e.g., imprecise angles) in and between the gantry and print bed. Sensor scans may detect such misalignments and provide corresponding data that indicates where the first layer of a print may be thicker or thinner than intended (e.g., by comparing the recorded shape with the commanded shape). Thicker or thinner layers may cause problems such as jamming in the print head when extruding and/or lack of adhesion to the bed. In this example, multi-tenant machine learning determines optimizations to help determine which extrusion locations might present problems with certain print sequences. Optimizations may be based on print duration and/or other factors.

In a fifth example, multi-tenant machine learning determines optimizations relating to fiber path length of a printer. A manufacturing device prints lengths of material (e.g., filament) and records statistical data regarding fiber paths (e.g., path length). Such information may indicate a print head's capability to print particular lengths of fiber and/or the lengths (e.g., minimum and/or maximum) of a particular fiber that a printer can deposit under particular conditions. In this example, multi-tenant machine learning determines optimizations to future printer design, such as proximity of the knife to the print head corresponding to an optimal cutoff.

In a sixth example, multi-tenant machine learning determines optimizations relating to consumables tracking for a printer. One or more device sensors may track the states of materials and consumables, such as wear to a Bowden tube or nozzle, providing information about how materials and consumables are used and/or wear down over time. Training data may also include information such as when materials are replenished and/or consumables are replaced. Such information may further be associated with printing events such as jamming and/or other print defects. In this example, multi-tenant machine learning determines optimizations with respect to preventative maintenance, such as a preventative maintenance schedule to avoid material depletion and/or failure of a consumable such as a Bowden tube or nozzle. The system may instruct a manufacturing device to stop printing when a condition requiring maintenance is detected, even if the material is not yet depleted and/or no failure in a consumable has yet occurred.

In a seventh example, multi-tenant machine learning determines optimizations relating to fiber placement confirmation. Some printing techniques include planning/pathing for laying fiber. A manufacturing device may scan an intended path for laying fiber, print the fiber, and scan the deposited fiber to confirm its location. In this example, multi-tenant machine learning determines optimizations such as adjustments to printing parameters (e.g., processes and commands) to control fiber printing and improve correspondence between the part specification and the resulting physical part. Improved correspondence between specifications and results may reduce the cost (in time, money, and goodwill) associated with rejected parts.

In an eighth example, multi-tenant machine learning determines optimizations relating to purge line quality of a printer. A manufacturing device may scan a purge line and identify scanned particulates. This data informs how the printer, materials, and consumables wear and operate over time. In this example, multi-tenant machine learning determines optimizations to help classify potential printer issues such as worn Bowden tubes and take action (e.g., replace a tube, change print head settings, swap a nozzle, replace material, etc.) with regard to print diagnostics and maintenance. This example may be combined with techniques described above relating to consumables tracking and/or idler wheel tracking.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 4:
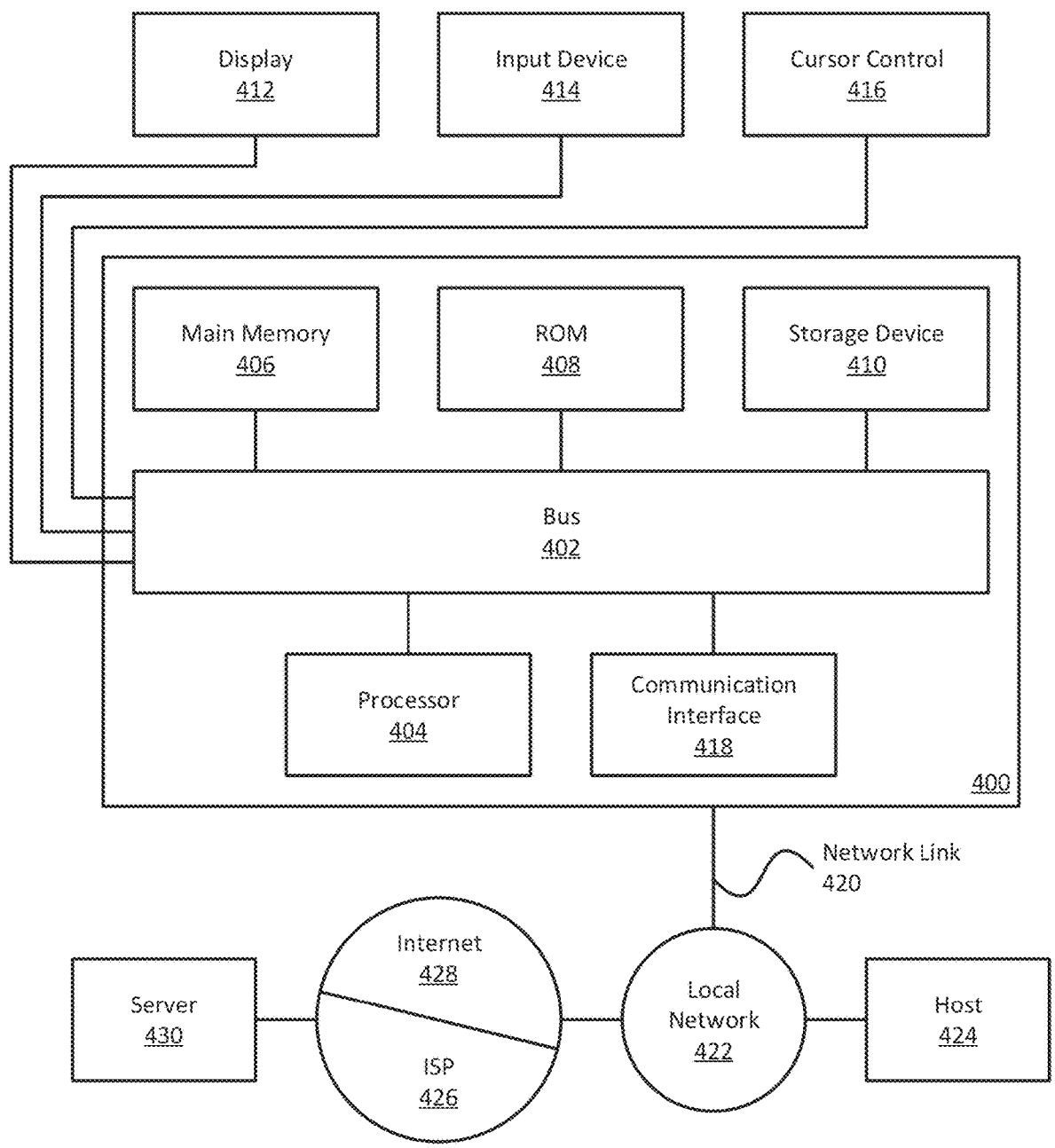
FIG. 4 is a block diagram of an example of a computer system according to an embodiment.

For example, FIG. 4 is a block diagram of an example of a computer system 400 according to an embodiment. Computer system 400 includes a bus 402 or other communication mechanism for communicating information, and a hardware processor 404 coupled with the bus 402 for processing information. Hardware processor 404 may be a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in one or more non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or additionally, computer system 400 may receive user input via a cursor control 416, such as a mouse, a trackball, a trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Alternatively or additionally, computer system 4 may include a touchscreen. Display 412 may be configured to receive user input via one or more pressure-sensitive sensors, multi-touch sensors, and/or gesture sensors. Alternatively or additionally, computer system 400 may receive user input via a microphone, video camera, and/or some other kind of user input device (not shown).

Computer system 400 may implement the techniques described herein using customized hard-wired logic, one or more ASICs or FPGAs, firmware, and/or program logic which in combination with other components of computer system 400 causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 402. Transmission media may also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 400 may receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

One or more embodiments described above include techniques for optimizing manufacturing such as 3D printing, CNC machining, and/or other kinds of manufacturing. A hub-and-spoke multi-tenant machine learning platform allows for machine learning using data from multiple tenants, based on physical sensor data from manufacturing devices, while maintaining the privacy of each tenant's respective data. Components and techniques described herein allow for training a multi-tenant machine learning model to generate manufacturing optimizations. An optimization may correspond to a change in a device, material, and/or manufacturing process. The hub-and-spoke architecture, as enforced by the specific operations of each component of the platform, prevents exposure of tenant-specific data to other tenants. In an embodiment, a client protects client data, for example by encrypting the data, such that it is only usable by that client and its spoke system.

What is claimed is:

1. A method comprising:
   obtaining first physical sensor data, by a first printing machine associated with a first tenant of a multi-tenant machine learning platform;
   comparing a print command sent to the first printing machine with a resultant material printed by the first printing machine;
   determining, by a first machine learning spoke system associated with the first tenant, a first machine learning parameter based on at least the first physical sensor data, the first machine learning parameter comprising information pertaining to the comparison of the print command sent to the first printing machine with the resultant material printed by the first printing machine;
   preventing exposure of the first physical sensor data of the first printing machine to any other tenant of the multi-tenant machine learning platform;
   transmitting the first machine learning parameter from the first machine learning spoke system to a machine learning hub system of the multi-tenant machine learning platform; and
   updating, by the machine learning hub system, a multi-tenant machine learning model based at least on the first machine learning parameter.

2. The method of claim 1, further comprising:
   obtaining second physical sensor data from a second manufacturing device associated with a second tenant of the multi-tenant machine learning platform;
   determining, by a second machine learning spoke system associated with the second tenant, a second machine learning parameter based on at least the second physical sensor data;
   preventing exposure of the second physical sensor data of the second manufacturing device to any other tenant of the multi-tenant machine learning platform;
   transmitting the second machine learning parameter from the second machine learning spoke system to the machine learning hub system; and
   updating, by the machine learning hub system, the multi-tenant machine learning model based at least on the second machine learning parameter.

3. The method of claim 2, further comprising:
   executing the multi-tenant machine learning model to determine a manufacturing optimization; and
   adjusting the second manufacturing device, associated with the second tenant of the multi-tenant learning platform, based at least on the manufacturing optimization.

4. The method of claim 3, further comprising:
   transmitting the manufacturing optimization from the machine learning hub system to the second machine learning spoke system associated with the second tenant,
   wherein adjusting the second manufacturing device is performed by the second machine learning spoke system responsive to receiving the manufacturing optimization from the machine learning hub system.

5. The method of claim 3, wherein the second tenant is subscribed to the multi-tenant machine learning platform to obtain the manufacturing optimization without contributing any machine learning parameter to the machine learning hub system.

6. The method of claim 1, wherein obtaining the first physical sensor data comprises obtaining data from a laser sensor of the first printing machine.

7. A system comprising:
   a first one or more processors; and
   a first one or more non-transitory computer-readable media storing instructions that, when executed by the first one or more processors, cause a first machine learning spoke system associated with a first tenant of a multi-tenant machine learning platform to perform operations comprising:
      obtaining first physical sensor data from a first printing machine;
      comparing a print command sent to the first printing machine with resultant material printed by the first printing machine;

determining a first machine learning parameter based on at least the first physical sensor data, the first machine learning parameter comprising information pertaining to the comparison of the print command sent to the first printing machine with the resultant material printed by the first printing machine;

preventing exposure of the first physical sensor data of the first printing machine to any other tenant of the multi-tenant machine learning platform; and transmitting the first machine learning parameter to a machine learning hub system of the multi-tenant machine learning platform, wherein the machine learning hub system is configured to update a multi-tenant machine learning model based at least on the first machine learning parameter.

8. The system of claim 7, further comprising:

a second one or more processors; and a second one or more non-transitory computer-readable media storing instructions that, when executed by a second one or more processors, cause a second machine learning spoke system associated with a second tenant of the multi-tenant machine learning platform to perform operations comprising:

obtaining second physical sensor data from a second manufacturing device;

determining a second machine learning parameter based on at least the second physical sensor data;

preventing exposure of the second physical sensor data of the second manufacturing device to any other tenant of the multi-tenant machine learning platform; and transmitting the second machine learning parameter to the machine learning hub system of the multi-tenant machine learning platform, wherein the machine learning hub system is further configured to update the multi-tenant machine learning model based at least on the second machine learning parameter.

9. The system of claim 7, further comprising:

a second one or more processors; and a second one or more non-transitory computer-readable media storing instructions that, when executed by a second one or more processors, cause a second machine learning spoke system associated with a second tenant of the multi-tenant machine learning platform to perform operations comprising:

receiving a manufacturing optimization, generated using the multi-tenant machine learning model, from the machine learning hub system; and adjusting a second manufacturing device based at least on the manufacturing optimization.

10. The system of claim 9, wherein the second tenant is subscribed to the multi-tenant machine learning platform to obtain the manufacturing optimization without contributing any machine learning parameter to the machine learning hub system.

11. The system of claim 7, wherein the first one or more processors and the first one or more non-transitory computer-readable media are components of the first printing machine.

12. A system comprising:

one or more processors; and one or more non-transitory computer-readable media storing instructions that, when executed by the one or more processors, cause a machine learning hub system of a multi-tenant machine learning platform to perform operations comprising:

receiving a first machine learning parameter from a first machine learning spoke system associated with a first tenant of the multi-tenant machine learning platform, the first machine learning parameter having been generated by the first machine learning spoke system based at least on first physical sensor data obtained from a first printing machine;

preventing exposure of the first physical sensor data of the first printing machine to any other tenant of the multi-tenant machine learning platform; and updating a multi-tenant machine learning model based at least on the first machine learning parameter.

13. The system of claim 12, the one or more non-transitory computer-readable media further storing instructions that, when executed by the one or more processors, cause the machine learning hub system to perform operations comprising:

receiving a second machine learning parameter from a second machine learning spoke system associated with a second tenant of the multi-tenant machine learning platform, the second machine learning parameter having been generated by the second machine learning spoke system based at least on second physical sensor data obtained from a second manufacturing device, while preventing the second physical sensor data to any other tenant of the multi-tenant machine learning platform; and updating the multi-tenant machine learning model based at least on the second machine learning parameter.

14. The system of claim 13, wherein updating the multi-tenant machine learning model based at least on the first machine learning parameter and updating the multi-tenant machine learning model based at least on the second machine learning parameter comprises:

computing a machine learning adjustment as a function of both the first machine learning parameter and the second machine learning parameter; and updating the multi-tenant machine learning model based on the machine learning adjustment.

15. The system of claim 12, the one or more non-transitory computer-readable media further storing instructions that, when executed by the one or more processors, cause the machine learning hub system to perform operations comprising:

executing the multi-tenant machine learning model to determine a manufacturing optimization; and transmitting the manufacturing optimization to a second machine learning spoke system associated with a second tenant of the multi-tenant machine learning platform, wherein the second machine learning spoke system uses the manufacturing optimization to adjust a second manufacturing device.

16. The system of claim 15, wherein the second tenant is subscribed to the multi-tenant machine learning platform to obtain the manufacturing optimization without contributing any machine learning parameter to the machine learning hub system.

* * * * *